United States Patent [19]

Suzuki et al.

[11] Patent Number: 5,257,889

[45] Date of Patent: Nov. 2, 1993

[54] APPARATUS FOR SELECTING SEEDLINGS AND TRANSFERRING THE SAME

[75] Inventors: Akira Suzuki; Hiroyoshi Konno; Tomonari Ohno; Koji Yamamoto, all of Tokyo, Japan

[73] Assignee: Kirin Beer Kabushiki Kaisha, Tokyo, Japan

[21] Appl. No.: 798,719

[22] Filed: Nov. 27, 1991

[30] Foreign Application Priority Data

Nov. 30, 1990 [JP] Japan .................... 2-333584
Aug. 7, 1991 [JP] Japan .................... 3-197975

[51] Int. Cl.$^5$ ............................. A01C 11/02
[52] U.S. Cl. ........................ 414/417; 47/901
[58] Field of Search ............. 414/404, 417, 416; 47/1.7, 73, 77, 901

[56] References Cited

U.S. PATENT DOCUMENTS

| 3,722,719 | 3/1973 | Frank ........................ 414/417 |
| 3,849,932 | 11/1974 | Adams ........................ 47/37 |
| 4,213,273 | 7/1980 | Dedolph ...................... 47/74 |
| 4,307,827 | 12/1981 | Turunen ...................... 47/77 X |
| 4,408,549 | 10/1983 | Qvarnström .................. 414/417 X |
| 4,443,151 | 4/1984 | Armstrong et al. ............ 414/417 X |
| 4,454,829 | 6/1984 | Sena .......................... 414/417 X |
| 4,770,594 | 9/1988 | Hamilton ..................... 414/417 X |
| 4,854,802 | 8/1989 | deGroot ...................... 414/404 |
| 5,131,185 | 7/1992 | Van Wingerden ............... 47/901 X |

FOREIGN PATENT DOCUMENTS

| WO88/03747 | 6/1988 | European Pat. Off. . |
| 0323674 | 7/1989 | European Pat. Off. . |
| WO90/10377 | 9/1990 | European Pat. Off. . |
| WO91/04653 | 4/1991 | European Pat. Off. . |
| 0426549 | 5/1991 | European Pat. Off. . |
| 0457405 | 11/1991 | European Pat. Off. ............. 47/901 |
| 2228910 | 9/1990 | United Kingdom . |

Primary Examiner—Michael S. Huppert
Assistant Examiner—James Keenan
Attorney, Agent, or Firm—Armstrong, Westerman, Hattori, McLeland & Naughton

[57] ABSTRACT

An apparatus for selecting seedlings and transferring the same. The apparatus comprises a feeding device for intermittently feeding a culture tray having a plurality of rows of rearing chambers to rear seedlings, sensor means for examining the quality of the seedlings, a pushing device for pushing upwardly seedlings having a good quality, a taking-out device for taking out the seedlings pushed upwardly from the rearing chambers, and a transferring device for receiving the seedlings taken out of the rearing chambers and transferring them to a delivery tray. With the above structure, the seedlings cultured in rearing chambers are automatically taken out, the quality of the seedlings are judged by the sensor means, and only good seedlings are automatically transferred to a delivery tray.

16 Claims, 17 Drawing Sheets

APPARATUS FOR SELECTING SEEDLINGS AND TRANSFERRING THE SAME

BACKGROUND OF THE INVENTION

The present invention relates to an apparatus for selecting seedlings and transferring the same, and more particularly to an apparatus which can automatically take out seedlings cultured in rearing chambers of a culture tray and judge the quality of seedlings, and which can automatically transfer only good seedlings to a delivery tray.

Recently, seedlings of vegetables, cereals and fruit trees supplied to farmers are mass-produced using a culture tray in, for example, a plant factory. The culture tray has a number of rearing chambers which are arrayed in the form of lattice, and a seedling is reared in the respective rearing chamber.

Conventionally, when delivering seedlings produced in the culture tray to farmers, the seedlings are taken out of the culture tray by man power and examined with the naked eye to see whether they are good or bad in quality, and only good seedlings are picked up and transferred onto a delivery tray for delivering to the farmers.

However, in the above conventional process, all works such as selecting, examination or transfer must be carried out by man power, thus a great deal of man power and much time are required. Further, the quality of the seedlings cannot be accurately judged because of being examined by the naked eye.

SUMMARY OF THE INVENTION

It is therefore an object of the present invention to provide an apparatus for selecting seedlings and transferring the same which can automatically take out seedlings cultured in rearing chambers of a culture tray and judge the quality of seedlings, and which can automatically transfer only good seedlings to a delivery tray.

In order to achieve the above object, in accordance with the present invention, there is provided an apparatus for selecting seedlings and transferring the same comprising: a first feeding device for intermittently feeding a culture tray having a plurality of rows of rearing chambers to rear seedlings, the rearing chamber having a hole at the bottom thereof; sensor means for examining the quality of the seedlings; a pushing device for pushing upwardly seedlings having a good quality, the pushing device having a plurality of pushers which are inserted into the respective holes of the rearing chambers; a taking-out device for taking out said seedlings pushed upwardly from the rearing chambers; and a transferring device for receiving the seedlings taken out of the rearing chambers and transferring them to a delivery tray.

According to the present invention, the culture tray having a plurality of rows of rearing chambers to rear seedlings is intermittently fed to a certain position by the first feeding device, the seedlings are examined by the sensor means whether they are good or bad in quality. Next, only good seedlings which are judged to be good by the sensor means are pushed out of the culture tray by actuation of the pusher of the pushing device. Thereafter, the good seedlings pushed upwardly are taken out of the rearing chambers and supplied to the transferring device. In the transferring device, the good seedlings are received and transferred to the delivery tray.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE INVENTION

An apparatus for selecting seedlings and transferring the same according to an embodiment of the present invention will be described below with reference to FIGS. 1 through 18.

Figure 1:
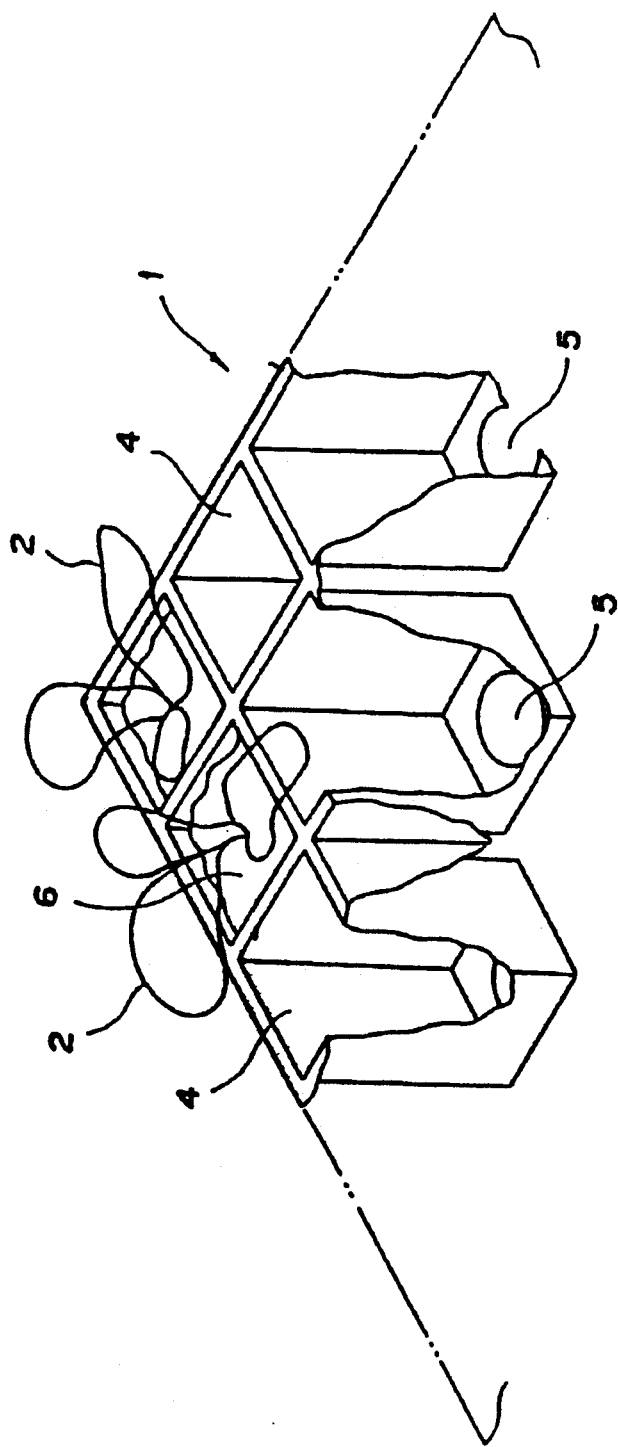
FIG. 1 is a perspective view with partially cutaway portion showing a culture tray.
Figure 2:
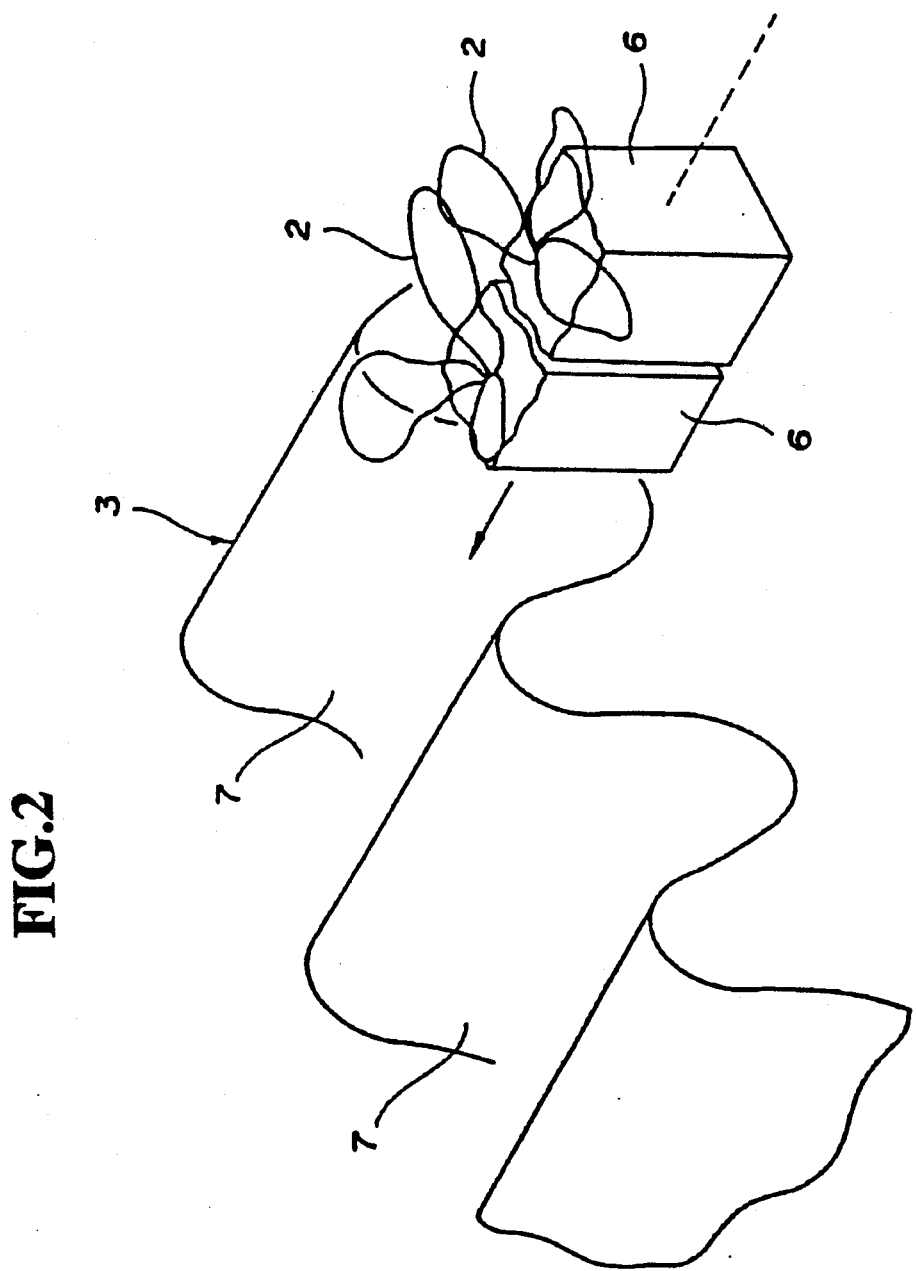
FIG. 2 is a perspective view with partially cutaway portion showing a delivery tray.

In the apparatus for selecting seedlings and transferring the same, seedlings 2 reared in a culture tray 1 as shown in FIG. 1 are automatically taken out therefrom and transferred to a delivery tray 3 as shown in FIG. 2. As shown in FIG. 1, the culture tray 1 is formed of synthetic resin sheet or the like and has a number of box-like receptacles, each receptacle defining therein rearing chamber 4, which are arrayed in the form of lattice. The box-like receptacle defining therein the rearing chamber 4 has a hole 5 at the bottom thereof. The rearing chamber 4 is filled with solid medium 6. A number of seedlings 2 are reared in all rearing chambers 4 of the culture tray 1. After the seedling 2 grows up to be a certain size, the seedling 2 is taken out of the rearing chamber 4 and transferred to the delivery tray 3.

The delivery tray 3 is also formed of synthetic resin sheet or the like and is corrugated. The delivery tray 3 has a plurality of grooves 7 which receive a row of the seedlings 2 together with solid mediums 6 taken out of the culture tray 1.

Figure 3:
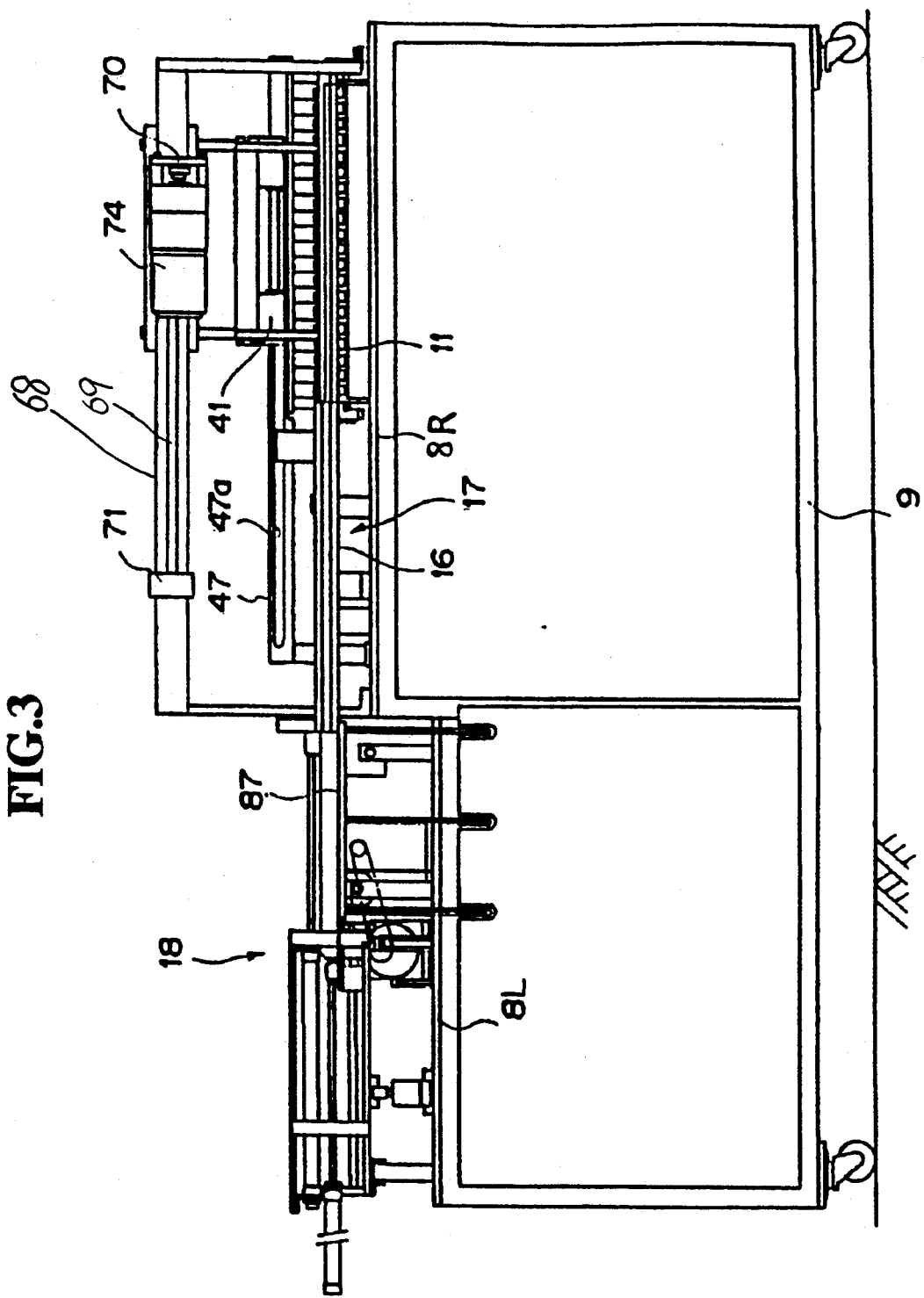
FIG. 3 is a front view showing an entire structure of an apparatus for selecting seedlings and transferring the same according to an embodiment of the present invention.
Figure 4:
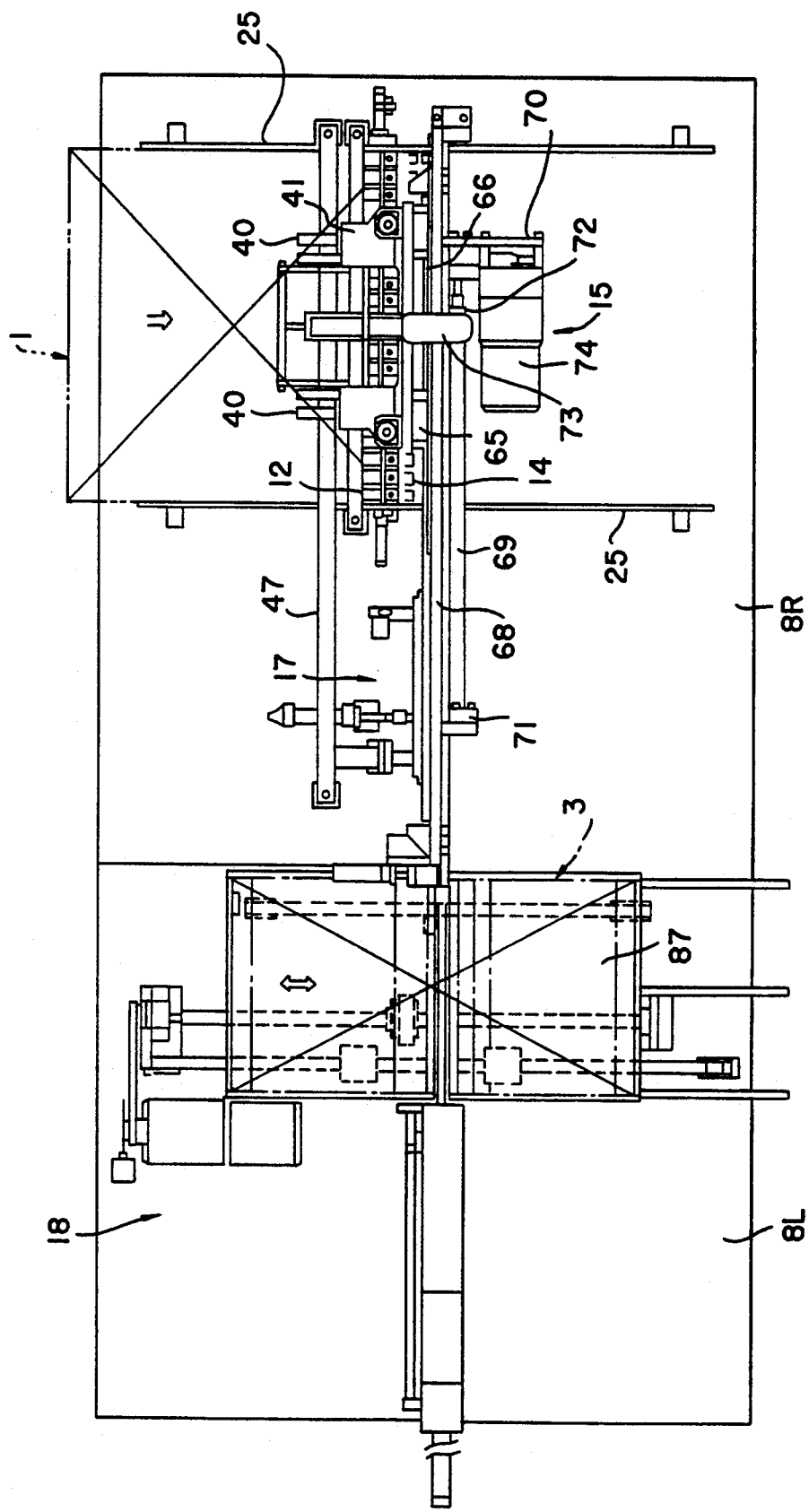
FIG. 4 is a plan view showing the apparatus for selecting seedlings and transferring the same shown in FIG. 3.
Figure 5:
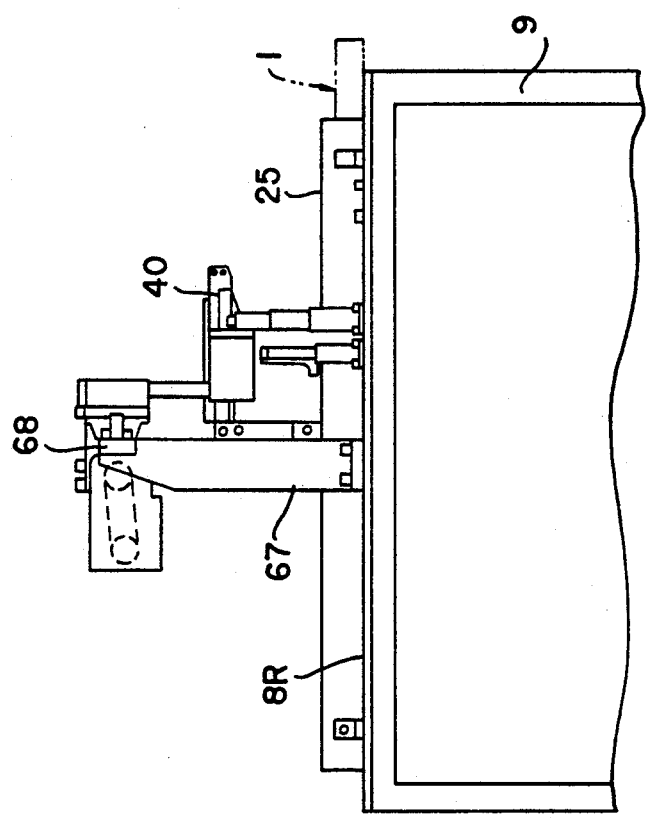
FIG. 5 is a right side view showing the apparatus for selecting seedlings and transferring the same shown in FIG. 2.

As shown in FIGS. 3 through 5, the apparatus for selecting seedlings and transferring the same comprises a base plate 8R extending horizontally and located on the right side, a base plate 8L having a lower horizontal plane than that of the base plate 8R and located on the left side, and a frame 9 supporting the base plate 8R and the base plate 8L. The culture tray 1 is placed above the base plate 8R, and the delivery tray 3 is placed above the base plate 8L. On the base plate 8R, there are provided a culture tray feeding device 10 (see FIG. 10) for intermittently feeding the culture tray 1 at one pitch intervals corresponding to a distance between adjacent two rows of the rearing chambers 4 of the culture tray 1, a row of sensors 11 for examining the quality of the seedlings in a row of rearing chambers 4, and a pushing device 13 (see FIG. 8) having a row of pushers 12 for pushing only good seedlings 2a (see FIG. 7) which are judged to be good quality by the sensors 11. Further, on the base plate 8R, there are provided a taking-out device 15 having a row of grippers 14 in which the good seedlings 2a pushed upwardly by the pushers 13 are taken out of the rearing chambers 4 and conveyed in the direction of the row of the rearing chambers 4, and a transferring device 17 having a transferring member 16 in which a row of the good seedlings 2a are received from the grippers 14 and transferred to the delivery tray 3. In the transferring device 17, the row of the good seedlings 2a which has been already received by the transferring member 16 is pushed and transferred onto the delivery tray 3 when the next row of the good seedlings 2a is conveyed by the grippers 14.

On the other hand, on the base plate 8L, there is provided a delivery tray feeding device 18 for intermittently feeding the delivery tray 3 in the direction parallel to the feeding direction of the culture tray 1.

Next, the above respective devices constituting the apparatus for selecting seedlings and transferring the same will be described in detail.

Figure 7:
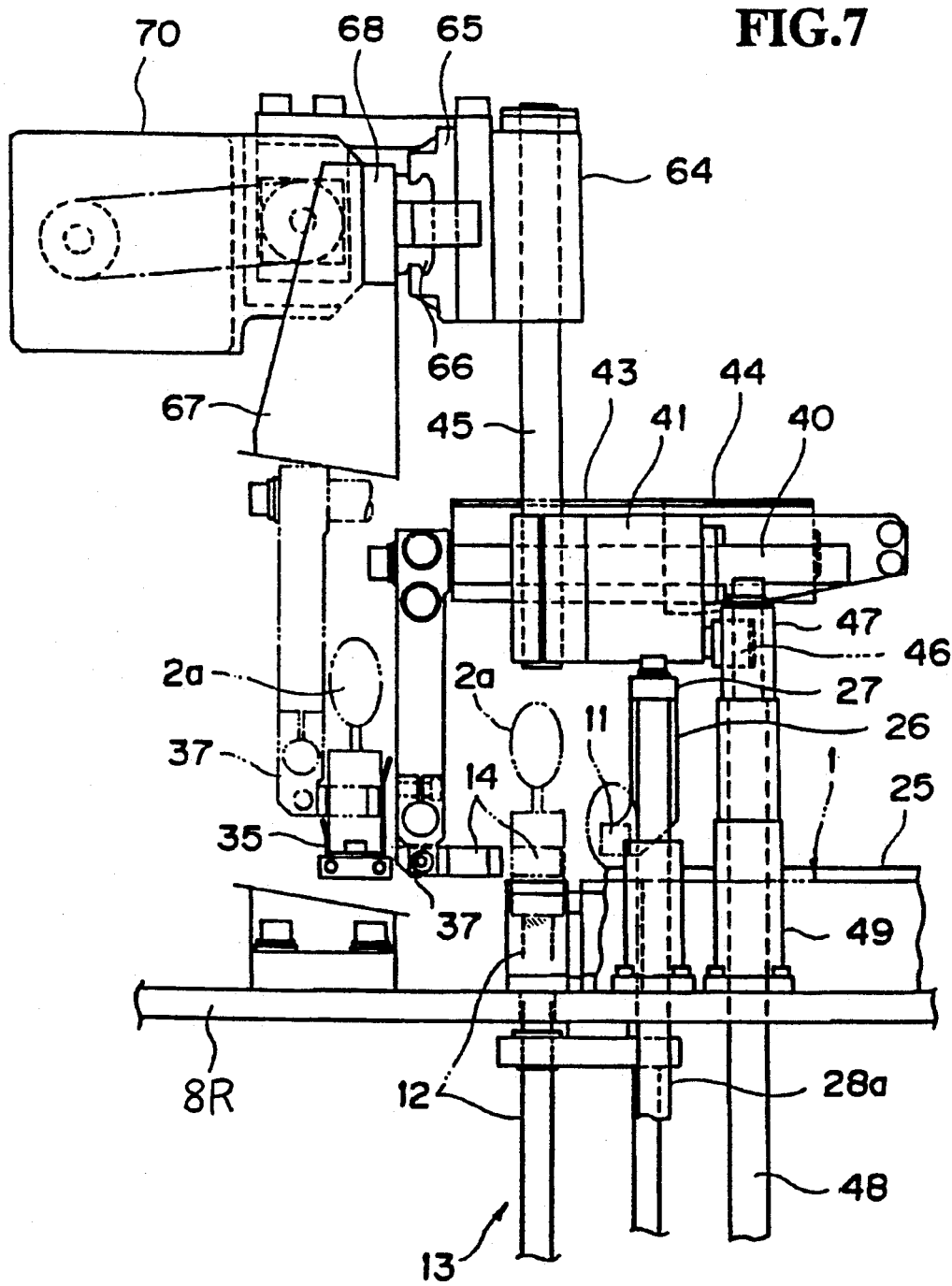
FIG. 7 is a right side view with partially cutaway portion showing the grippers and sensors.
Figure 10:
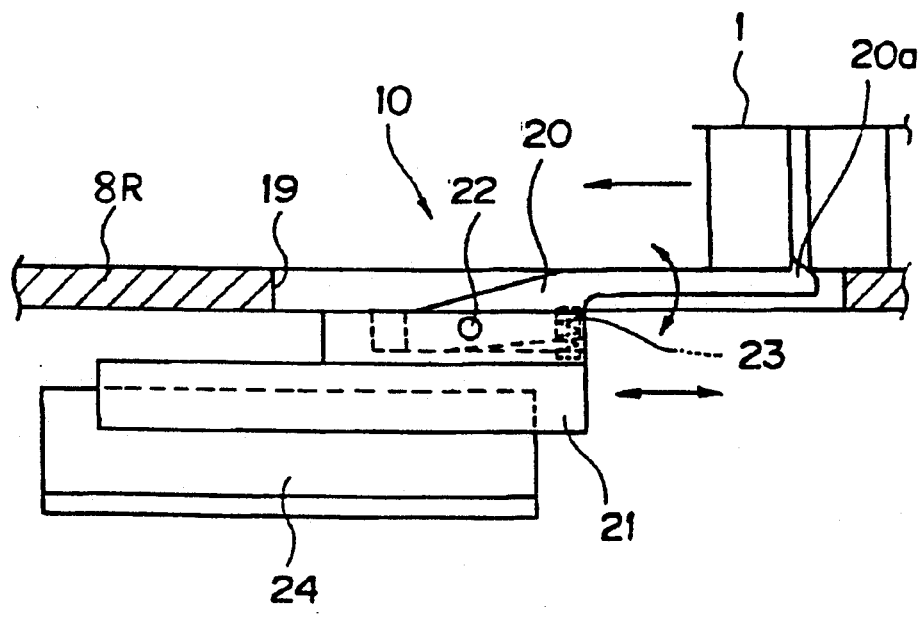
FIG. 10 is a side view showing a culture tray feeding device of the apparatus for selecting seedlings and transferring the same.

In order to feed the culture tray 1 on the base plate 8R from the right side to the left side in FIG. 7, the culture tray feeding device 10 is provided on the base plate 8R so as to place the culture tray 1 thereon as shown in FIG. 10. That is, the base plate 8R is formed with a oblong hole 19 extending in a feeding direction of the culture tray 1, and a engaging member 20 is loosely fitted with the oblong hole 19. The engaging member 20 is supported through a horizontal pin 22 by a slider 21 which is reciprocally movable under the base plate 8R along the feeding direction of the culture tray 1. The engaging member 20 is rotatably supported by the slider 21 so that a engaging portion 20a takes two positions where the engaging portion 20a projects from the oblong hole 19 to engage with the bottom of the culture tray 1 and where the engaging portion 20a retreats into the oblong hole 19 to disengage from the culture tray 1. The engaging member 20 is urged by a compression spring 23 so as to take a position of engaging with the bottom of the culture tray 1 in a normal condition. The slider 21 is reciprocally movable by a width of the rearing chamber 4 along a guide rail 24 installed under the base plate 8R.

With the above structure, when the engaging member 20 is moved from the position of FIG. 10 to the left side by movement of the slider 21, the culture tray 1 is moved to the left side by one pitch of the row of the rearing chamber 4 due to engagement of the engaging portion 20a and the culture tray 1. Alternatively, when the engaging member 20 is moved to the right side, the engaging portion 20a is pushed by the bottom surface of the culture tray 1 and rotated slightly downwardly. When the engaging member 20 is further moved to the right side and reaches the next row of the rearing chamber 4, the engaging portion 20a is engaged with the bottom of the next row of the rearing chamber 4.

By repeating the above operation, the culture tray 1 is intermittently fed by one pitch of the row of the rearing chamber 4. In order to feed the culture tray 1 accurately in the feeding direction of the culture tray 1, guide plates 25 are provided in parallel with each other on the base plate 8R as shown in FIGS. 4 and 5.

Figure 6:
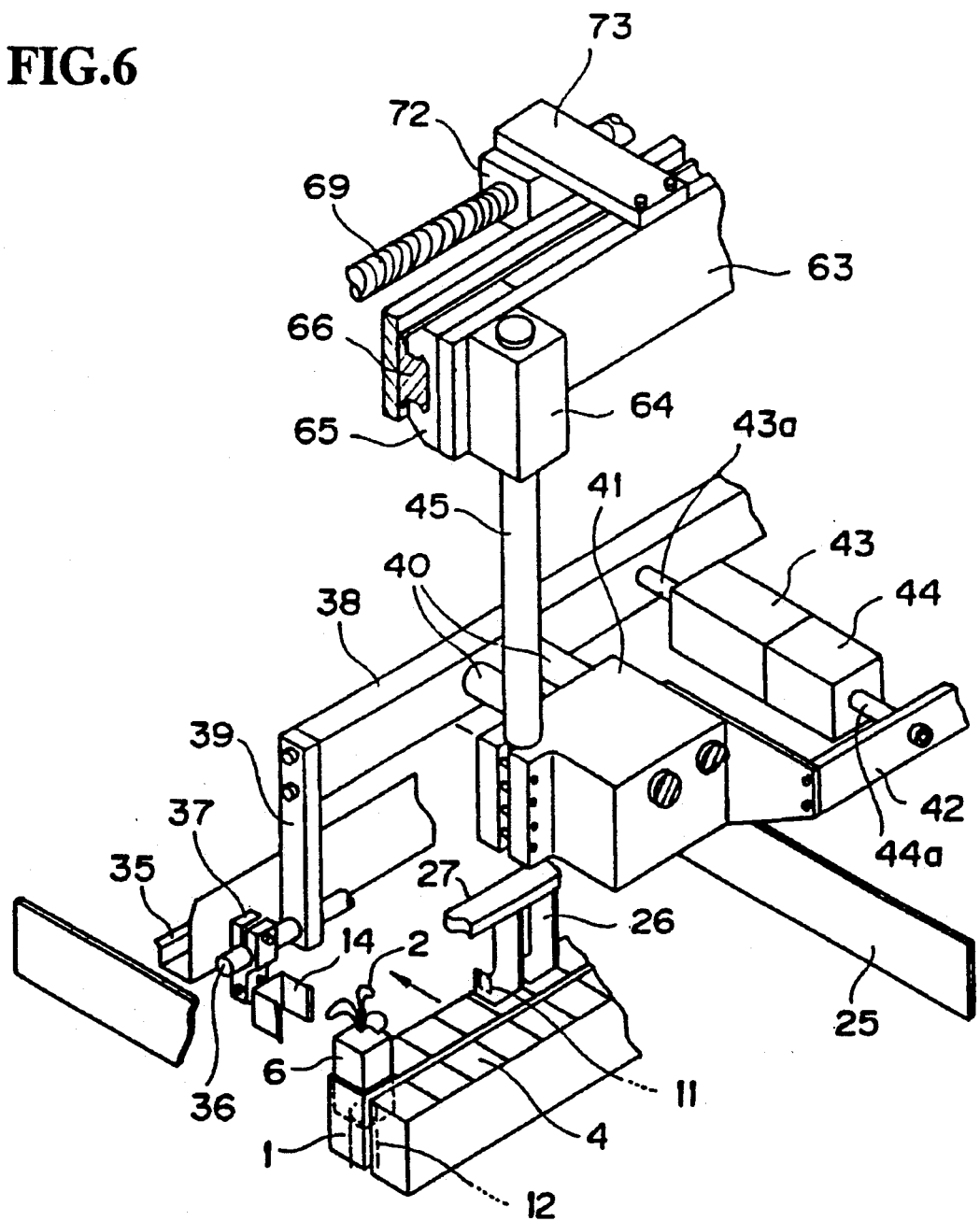
FIG. 6 is a perspective view showing a driving mechanism of grippers.
Figure 9:
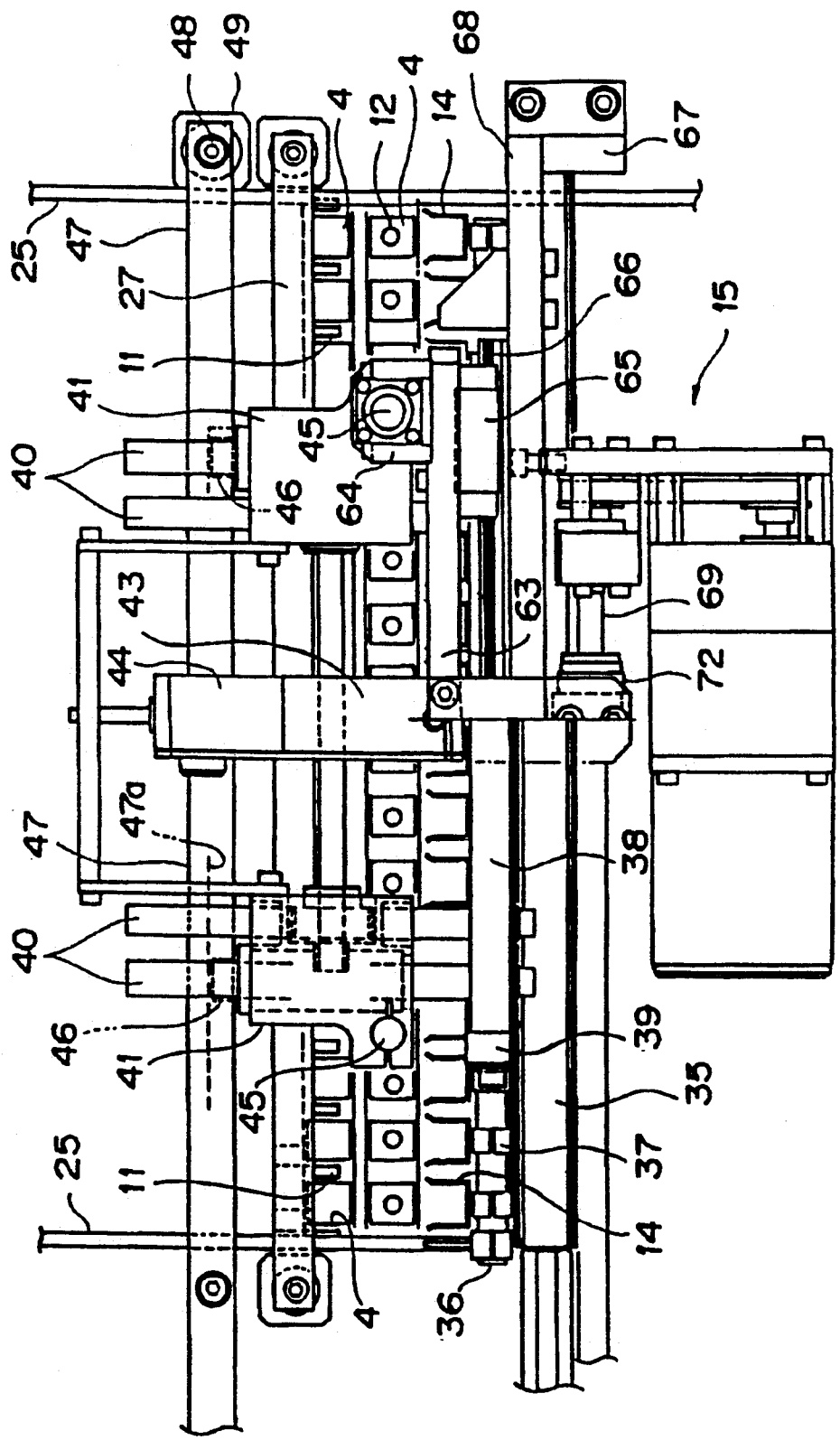
FIG. 9 is a plan view with partially cutaway portion showing the right side portion of the apparatus for selecting seedlings and transferring the same.

Next the sensors 11 will be described in detail. A row of sensors 11 is disposed above the feeding passage of the culture tray 1 to examine whether the seedlings 2 are good or bad in quality as shown in FIGS. 6, 7 and 9. The sensor 11 is reflecting type, and a row of sensors 11 are provided so as to correspond to the row of the rearing chambers 4. Reference numeral 26 denotes a supporting arm for supporting the sensor 11, each supporting arm 26 is fixedly secured to a lateral bar 27 extending in a direction of a row of the rearing chambers 4. Below the base plate 8R, there are provided two air cylinders 28 and 29 connected to each other in series at both side ends of the lateral bar 27. The air cylinder 28 includes a cylinder rod 28a having an upper end which is connected to the lateral bar 27. The air cylinder 29 includes a cylinder rod 29a having a lower end which is connected to the frame 9.

With the above structure, the sensor 11 is stopped at the three positions where the air cylinder rods 28a and 29a retreat, where the air cylinder rod 28a projects and the air cylinder rod 29 retreats, and where the air cylinder rods 28 and 29 project. Therefore, the growth degree of the seedling 2 is examined at the three positions in a vertical direction of the seedling 2. In this embodiment, only the seedling 2 which is judged to be good in all three positions is judged to be good quality.

After judging a row of the seedlings 2 in quality, the culture tray 1 is fed by one pitch of the culture tray 1 by the culture tray feeding device 10.

Figure 8:
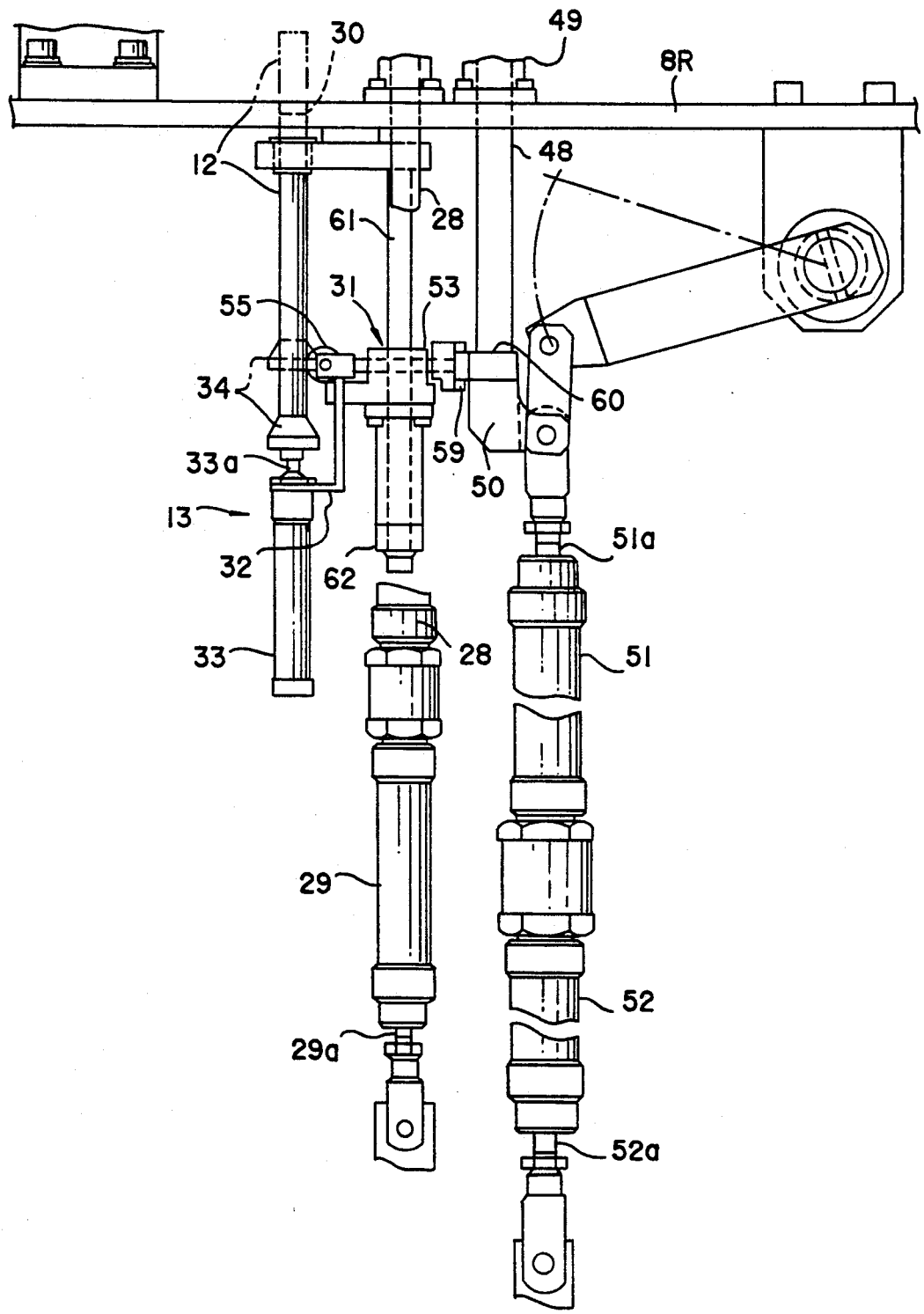
FIG. 8 is a right side view with partially cutaway portion showing a driving mechanism of the grippers and the sensors.

Next the pushing device 13 will be described in detail. The pushing device 13 is provided with a row of pushers 12 so as correspond to the row of the sensors. The pusher 12 is provided perpendicularly to the base plate 8R as shown in FIG. 8. A row of holes 30 are provided on the base plate 8R to allow a row of pushers 12 to pass therethrough. Each pusher 12 is connected to a cylinder rod 33a of an air cylinder 33. The air cylinder 33 is connected to a clutch device 31 through a coupler 32.

When the air cylinder 33 is not actuated, the forward end of the pusher 12 retreats in the hole 30, and when the air cylinder 33 is actuated, the forward end of the pusher 12 projects from the base plate 8R upwardly.

The air cylinders 33 corresponding to the seedlings 2 which are judged to be good by the sensors 11 are adapted to be actuated, whereby each pusher 12 actuated by the air cylinder 33 passes through the hole 5 formed on the bottom of the rearing chamber 4 and pushes only good seedling 2a. The pushing height is about two thirds of the depth of the rearing chamber 4, therefore, the lower portion of the solid medium 6 remains in the rearing chamber 4 at the first stage of pushing. The pusher 12 is formed with a truncated-cone-shaped cam 34 at the intermediate portion thereof, whereby the pusher 12 is interconnected to the taking-out device 15 when the pusher 12 projects to the uppermost position by the air cylinder 33.

Next, the taking-out device 15 will be described in detail. The taking-out device 15 is provided with a row of the grippers 14 for gripping the good seedlings 2a which are being pushed upwardly by the pushers 12. The gripper 14 is made of spring material and bent into U-shape, so that the solid medium 6 projecting from the rearing chamber 4 is gripped elastically by the gripper 14. Each gripper 14 is provided so as to correspond to each pusher 12 and disposed in front of the pusher 12 as shown in FIGS. 7 and 9. Further, a receiving member 35 is provided along a row of the grippers 14 and ahead of the grippers 14. The receiving member 35 is adapted to receive the solid medium 6 of the good seedlings 2a which are conveyed by the gripper 14. The receiving member 35 is fixedly secured to the base plate 8R.

As shown in FIG. 7, the grippers 14 move rightward from the position shown by the solid line toward the rearing chambers 4 and grip the good seedlings 2a, and then the grippers 14 move upwardly and go across over the receiving member 35. Thereafter, the grippers 14 reach the position shown by the imaginary line in FIG. 7, and then move leftward in FIG. 9 while the solid mediums 6 of the good seedlings 2a are supported by the receiving member 35. Thus, the grippers 14 transfer the good seedlings 2a to the transferring device 17 and return to the solid line position (see FIG. 7) again. In order for the grippers 14 to perform such movement, the taking-out device 15 is provided with a mechanism as shown in FIGS. 6 through 9. That is, each gripper 14 is supported by a shaft 36 through a coupler 37 at a certain pitch. The position of the coupler 37 is adjustable relative to the shaft 36. The shaft 36 is supported by a lateral bar 38 through a vertical member 39. Two guide bars 40 are connected to both sides of the lateral bar 38, and each guide bar 40 passes through a block member 41 so that the guide bar 40 is slidable relative to the block member 41. Two block members 41 at both sides of the lateral bar 38 are connected to each other by a connecting member 42 which is in confrontation with the lateral bar 38. The connecting member 42 and the lateral bar 38 are connected to each other by two air cylinders 43, 44 which are connected in series. Thus, the grippers 14 are moved rightward from the position (reference position) shown by the solid line to the position (on the right side of the reference position) shown by the imaginary line when the air cylinder 43 is in a retreated condition, the grippers 14 are moved leftward to the position (on the left side of the reference position) shown by the imaginary line when both the air cylinders 43, 44 are in an extended condition in FIG. 7. A vertical guide bar 45 extending vertically is fixedly secured to one side of the block member 41. A roller 46 is rotatably provided on the rear side of the block member 41.

On the other hand, on the base plate 8R, there is provided a lateral guide member 47 having a guide groove 47a for guiding the roller 46 in a horizontal direction. Vertical guide rods 48 are attached to both side ends of the lateral guide member 47, each vertical guide member 48 is fitted with the bearing member 49 which is vertically provided on the base plate 8R. The vertical guide rod 48 has a lower end to which a bracket 50 is attached. The bracket 50 and the frame 9 are connected to each other by the air cylinders 51, 52 which are connected in series. Thus, when the air cylinders 51 and 52 are actuated, the lateral guide member 47 is moved upwardly from the position shown by the solid line in FIG. 7, thereby lifting the block member 41 which is engaged with the lateral guide member 47 through the roller 46. As a result, the grippers 14 are raised higher than the receiving member 35 while holding the good seedlings 2a. Thereafter, the air cylinders 43 and 44 are actuated and the grippers 14 are moved leftward across over the receiving member 35. Then the air cylinder 51 performs a retreated operation, the grippers 14 and the good seedlings 2a are lowered to the position shown by the imaginary line in FIG. 7, thereby supplying the good seedlings 2a to the receiving member 35.

When the pusher 12 of the pushing device 13 is lifted, the pusher 12 is engaged with the vertical guide rod 48 through the clutch device 31 and thus moved upwardly together with the vertical guide rod 48.

Figure 11:
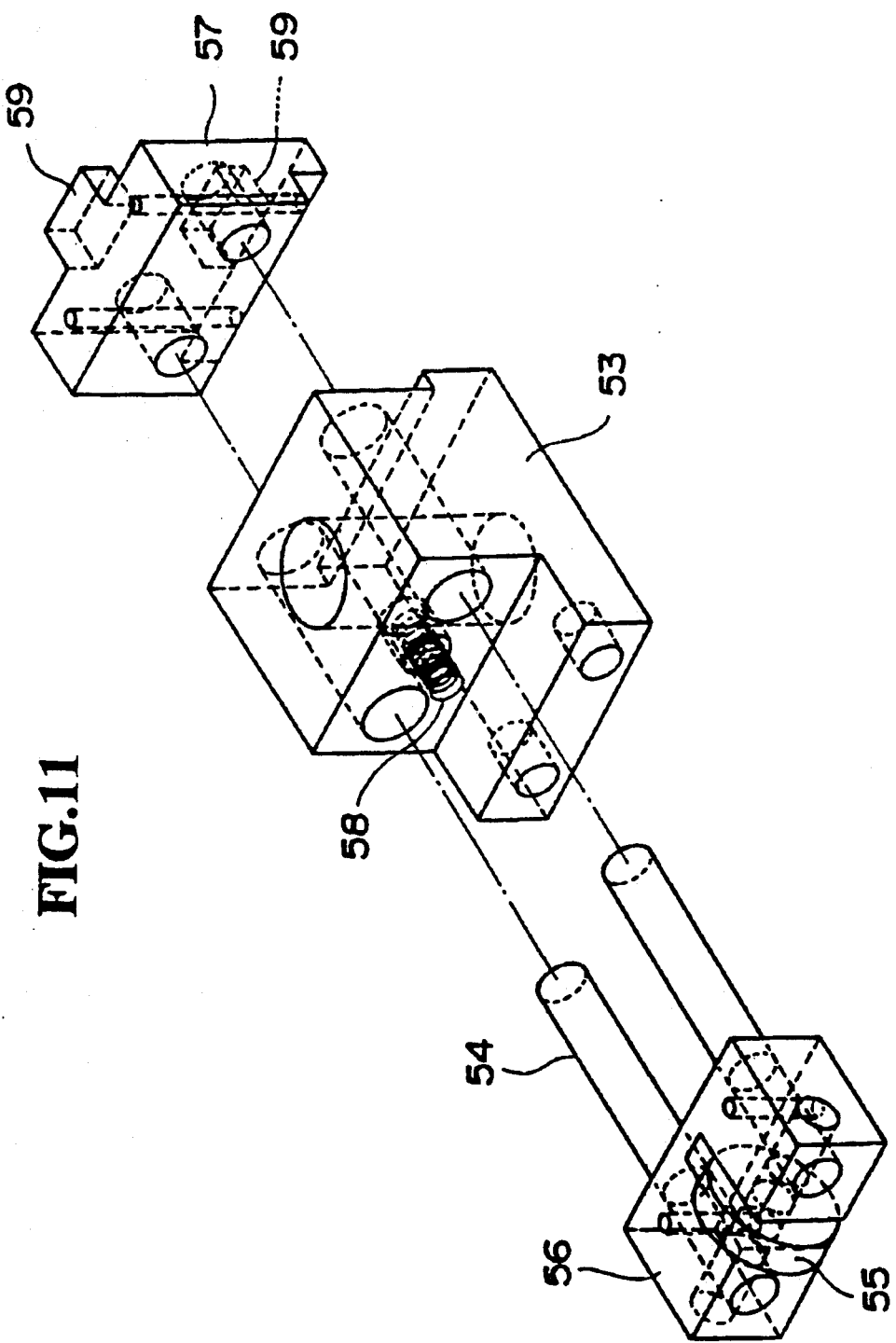
FIG. 11 is an exploded perspective view showing a clutch device of the apparatus for selecting seedlings and transferring the same.

As shown in FIGS. 8 and 11, the clutch device 31 comprises a clutch body 53 connected to the air cylinder 33 for actuating the pusher 12, a sliding bar 54 slidably piercing through the clutch body 53, a bearing member 56 fixed to the left side end of the sliding bar 54 and supporting a roller 55, an engaging member 57 fixed to the left side end of the sliding bar 54, and a compression spring 58 accommodated in the clutch body 53 for urging the roller 55 so as to cause the roller 55 to move away from the clutch body 53. The roller 55 normally projects into the passageway of the cam 34 by urging force of the compression spring 58, and engaging portions 59 of the engaging member 57 are in confrontation with a plate 60 which are integrally formed on the bracket 50 provided on the lower portion of the vertical guide rod 48.

Further, the vertical guide rod 61 extending downwardly from the lower surface of the base plate 8R passes through the clutch body 53 vertically, and the clutch body 53 contacts a stopper 62 provided on the lower portion of the vertical guide rod 61, thereby causing the clutch body 53 to stop. Therefore, when pusher 12 projects upwardly and the cam 34 pushes the engaging member 57 rightward through the roller 55, the engaging portions 59 of the engaging member 57 are engaged with the plate 60. As a result, while the lateral guide member 47 and the grippers 14 are lifted, the pushers 12 are further lifted in the rearing chambers 4, thereby pushing out the good seedlings 2a from the rearing chambers 4 completely.

As shown in FIGS. 6, 7 and 9, the upper portion of the vertical guide bar 45 provided vertically on the block member 41 is connected to two sliders 65, spacedly provided with each other, through a bearing 64. Two sliders 65 are engaged with a guide rail 66 and connected to each other through a connecting plate 63, whereby the two sliders 65 move integrally along the guide rail 66. The guide rail 66 extends in a horizontal direction above the grippers 14, the guide rail 66 is attached to the backside of a beam member 68 supported by the base plate 8R through a vertical frame 67.

Figure 12:
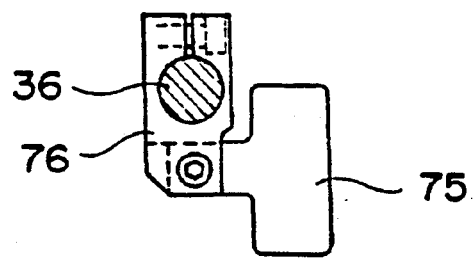
FIG. 12 is a side view showing a pushing plate of the apparatus for selecting seedlings and transferring the same.

A feed screw 69 is provided adjacent to and along the guide rail 66. As shown in FIGS. 3 and 4, the feed screw 69 extends from the central upper position of a row of the grippers 14 to the transferring device 17, the feed screw 69 is provided between the bracket 70 and the bracket 71 which are fixed to the beam member 68. A nut 72 is engaged with the feed screw 69, and the nut 72 and the connecting plate 63 are connected by a connecting plate 73 (see FIG. 6). The motor 74 for driving the feed screw 69 is attached to the bracket 70. When the good seedlings 2a are received by the receiving member 35 as shown in FIG. 7, the motor 74 is rotated and the sliders 65 are moved leftward along the guide rail 66 in FIGS. 3 and 4. Therefore, the grippers 14 are moved leftward while gripping the good seedlings 2a. As shown in FIG. 12, a pushing plate 75 is connected to the left side end of the shaft 36 through a connecting member 76 so that the pushing plate 75 pushes the good seedlings 2a which have been already supplied to the transferring member 16 (described later) when the grippers 14 are being moved leftward. Therefore, when the grippers 14 are moved leftward, the pushing plate 75 advances at the head of the grippers 14.

Figure 14:
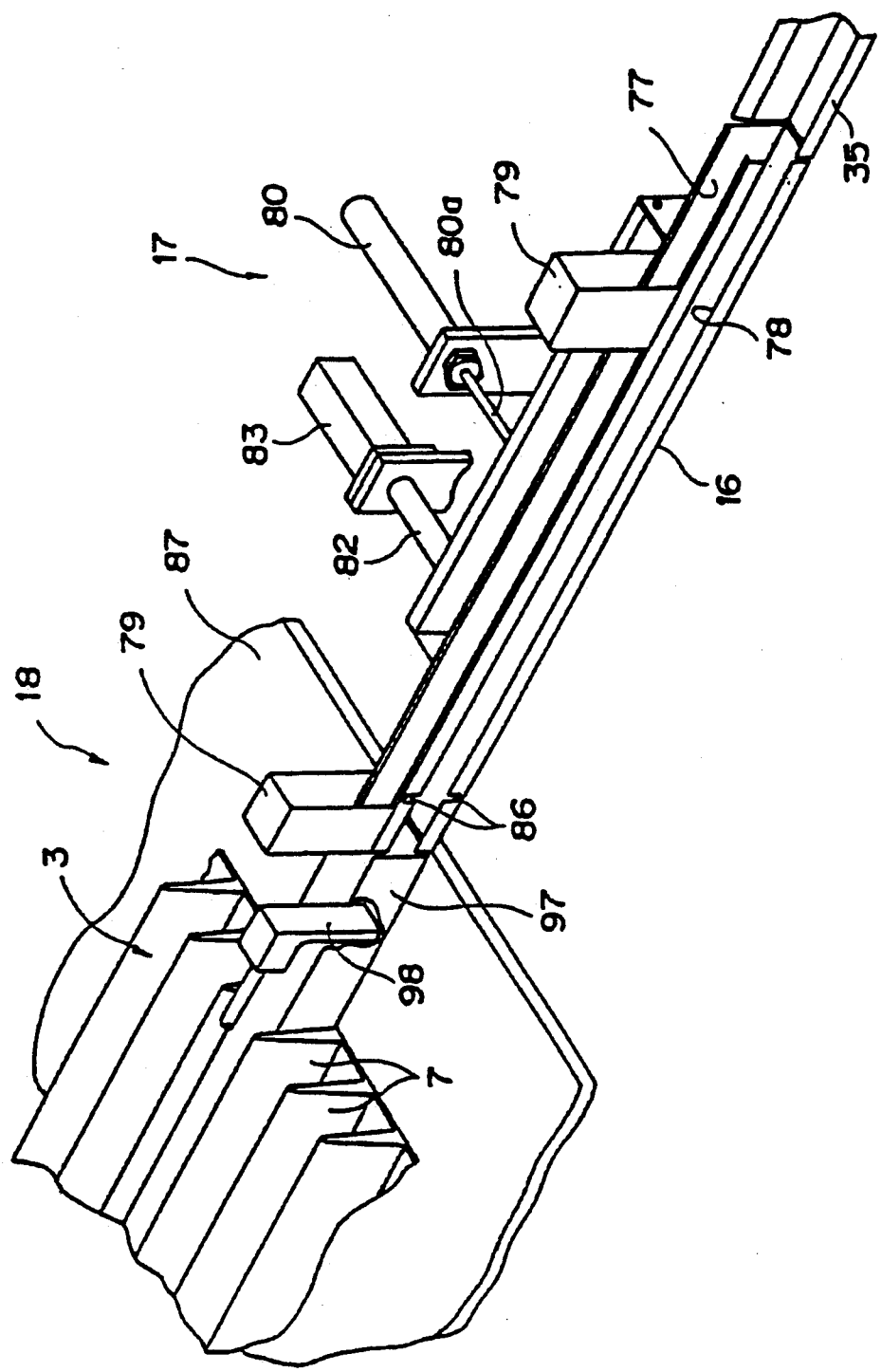
FIG. 14 is a perspective view showing the transferring member and surroundings thereof of the apparatus for selecting seedlings and transferring the same.
Figure 15:
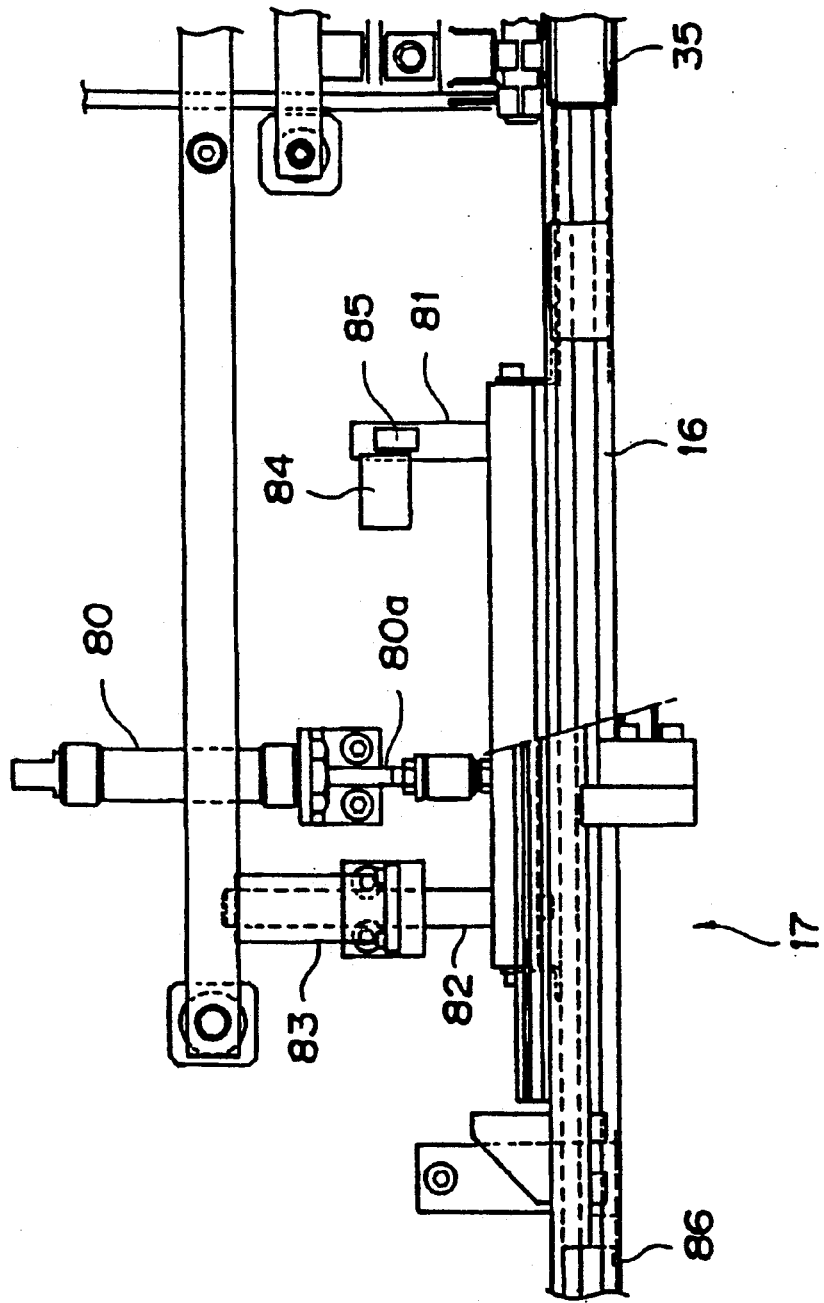
FIG. 15 is a plan view showing partially the transferring member and surroundings thereof of the apparatus for selecting seedlings and transferring the same.

Next, the transferring device 17 will be described below in detail. The transferring device 17 is provided with the transferring member 16 which are engageable with the receiving member 35 or disengageable from the receiving member 35 as shown in FIGS. 14 and 15.

The transferring member 16 has a cross section corresponding to the solid medium 6 of the seedlings 2 so that the solid medium 6 is accommodated in the transferring member 16. The transferring member 16 is formed with a slit 77 for allowing stalks of the seedlings 2 to pass through and a slit 78 for allowing the grippers 14 to pass through. Supporting arms 79 are provided to maintain the shape of the transferring member 16.

The transferring member 16 is connected to a forward end of a cylinder rod 80a of an air cylinder 80 provided on the base plate 8R so that the transferring member 16 is moved on the base plate 8R. Further, guide bars 81 and 82 are connected to the transferring member 16 so that the transferring member 16 is moved smoothly. The guide bar 82 is supported by a thrust bearing 83 provided horizontally on the base plate 8R, the guide bar 81 is nipped between upper and lower rollers 85 provided on the base plate 8R through a bracket 84.

Figure 13:
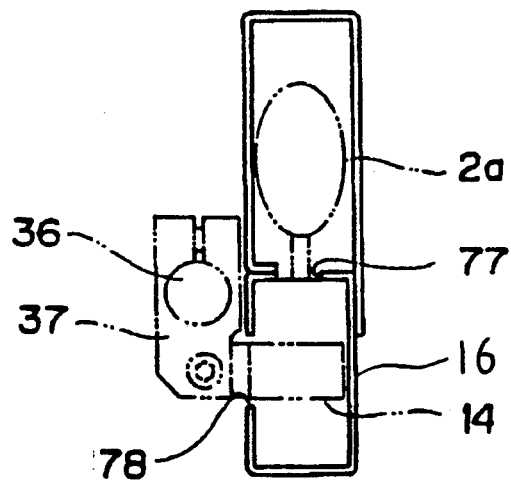
FIG. 13 is a right side view showing a transferring member of the apparatus for selecting seedlings and transferring the same.

When the grippers 14 gripping the good seedlings 2a are moved leftward, the grippers 14 together with the good seedlings 2a are entered into the transferring member 16 and stop when the tail end of the good seedlings 2a is introduced into the transferring member 16 as shown in FIG. 13. Thereafter, the air cylinder 80 is actuated, the transferring member 16 is disengaged from the receiving member 35 in a direction perpendicular to a longitudinal direction of the receiving member 35. Thus, the transferring member 16 receives the good seedlings 2a from the grippers 14, and the grippers 14 come out of the transferring member 16 through the slit 78.

Thereafter, the row of the grippers 14 return to the original position by the reverse rotation of the motor 74, and the transferring member 16 returns to the original position to thus cause the transferring member 16 to engage with the receiving member 35. The pushing plate 75 comes out of the transferring member 16 through a vertical notch 86 formed on the left side of the transferring member 16 when the transferring member 16 is disengaged from the receiving member 35.

Figure 16:
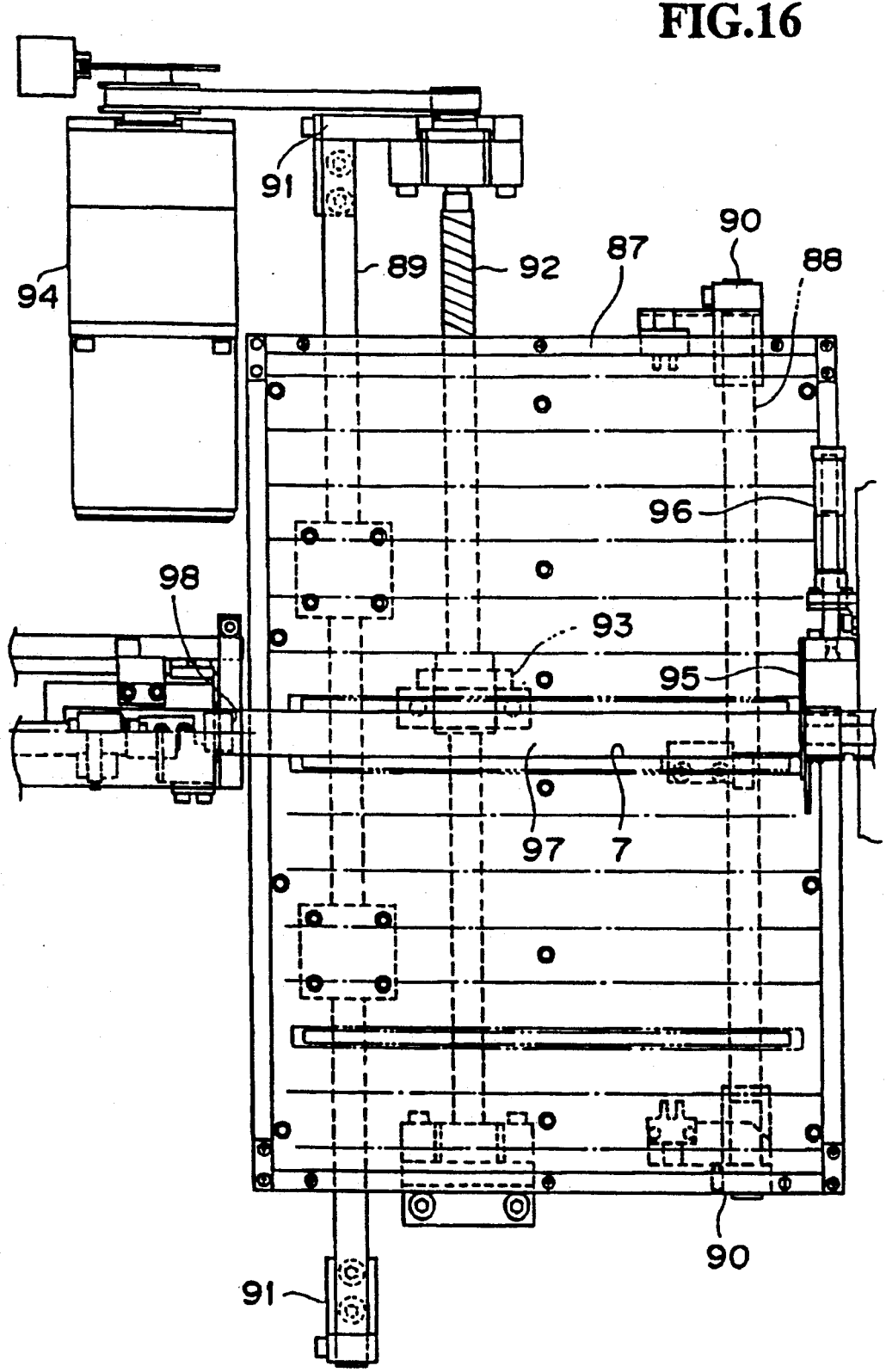
FIG. 16 is a plan view showing of a table of the apparatus for selecting seedlings and transferring the same.
Figure 17:
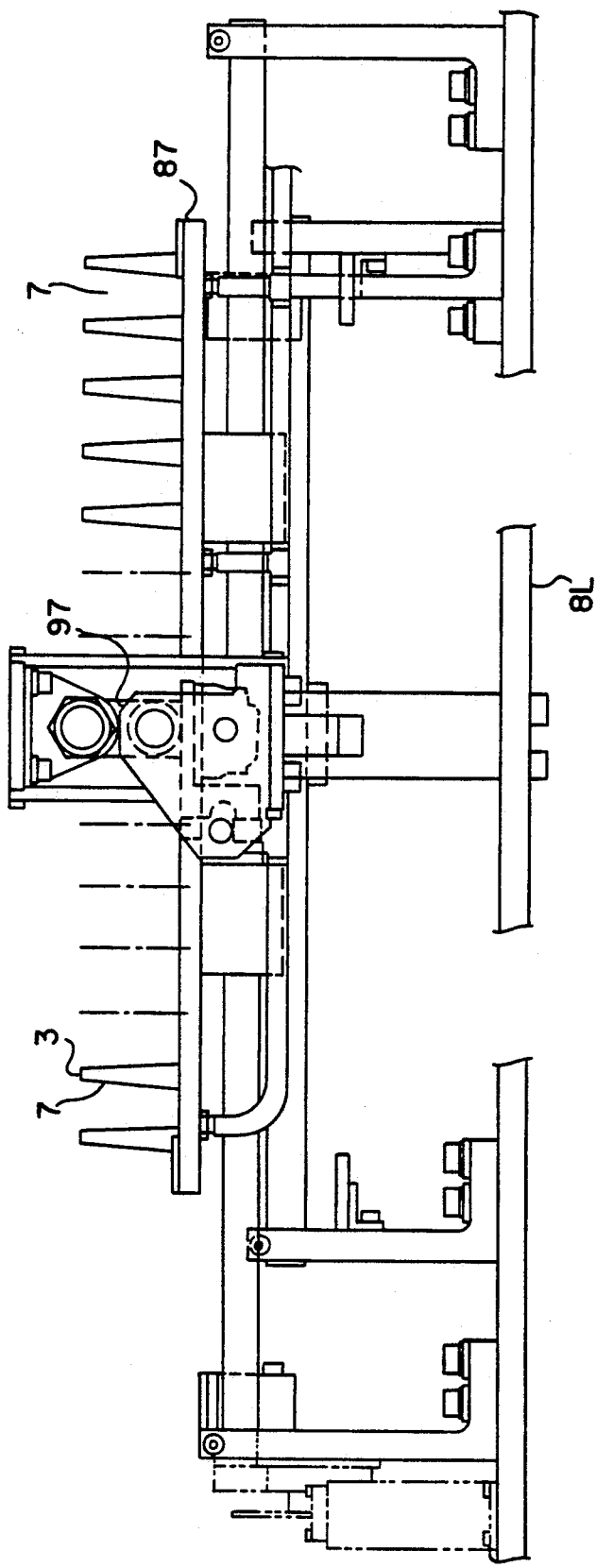
FIG. 17 is a left side view showing the table of the apparatus for selecting seedlings and transferring the same.
Figure 18:
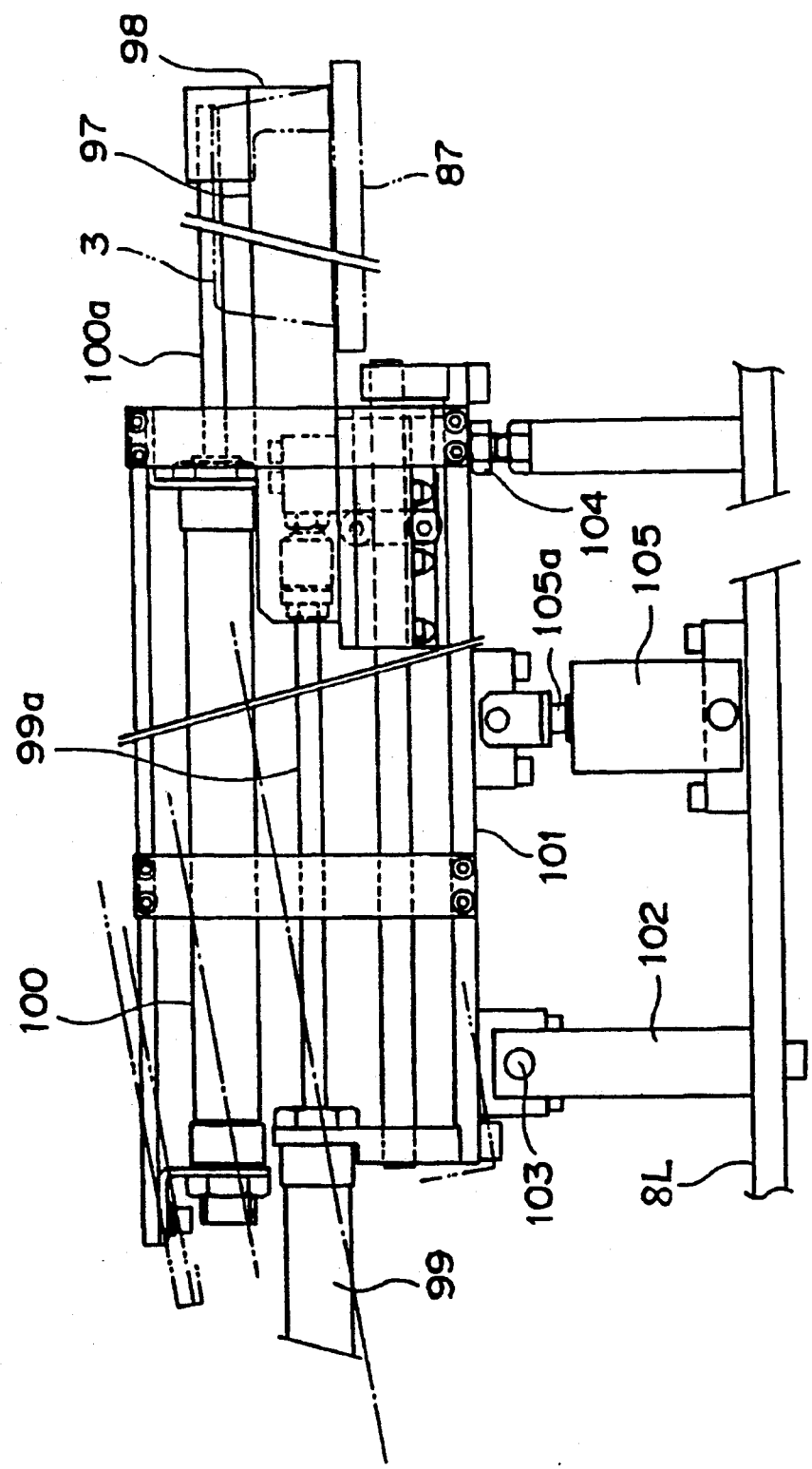
FIG. 18 is a front view showing an expander and a support disposed adjacent to the table of the apparatus for selecting seedlings and transferring the same.

When the pushing plate 75 and the grippers 14 move in the transferring member 16, the good seedlings 2a which have been already received in the transferring member 16 are pushed out therefrom while introducing the next row of the good seedlings 2a into the transferring member 16. The good seedlings 2a pushed out of the transferring member 16 are received on the delivery tray 3. On the left side of the transferring member 16, there is provided the delivery tray feeding device 18 which feeds the delivery tray 3 in parallel to the feeding direction of the culture tray 1 as shown in FIGS. 16 through 18. The delivery tray 3 is placed on a table 87 provided above the base plate 8L and fed by one pitch distance at every time when the good seedlings 2a are supplied into the groove 7 of the delivery tray 3.

That is, the table 87 is connected to two guide bars 88 and 89 extending horizontally above the base plate 8L. The guide bars 88 and 89 are fixed to the base plate 8L through brackets 90 and 91. The table 87 is movable in a back and forth direction by the ball screw mechanism, a screw 92 is disposed above the base plate 8L in parallel to the guide bars 88 and 89. The nut 93 engaged with the screw 92 is fixedly secured to the lower surface of the table 87. The screw 92 mounted on the base plate 8L is rotated by a motor 94. A shutter 95 is provided at the position where the left side end of the transferring member 16 confronts the table 87 (see FIG. 16), and the shutter 95 is adapted to shut the transferring member 16 when feeding the delivery tray 3. The shutter 95 is actuated by an air cylinder 96. On the left side of the table 87, there are provided an expander 97 for expanding the groove 7 of the delivery tray 3 as shown in FIGS. 14 and 15, and a support 98 for supporting a leading good seedling 2a when pushed in the groove 7. The expander 97 has a groove corresponding to the groove 7 of the delivery tray 3, and connected to a forward end of a cylinder rod 99a of an air cylinder 99. The expander 97 is positioned at the left side of the table 87 before actuation of the air cylinder 99 and the expander 97 projects on the groove 7 when the air cylinder 99 is actuated. The support 98 is connected to a forward end of a cylinder rod 100a of an air cylinder 100, and the support 98 is moved from the right to the left side in the expander 97 which is inserted into the groove 7 by the actuation of the air cylinder 100. Two air cylinders 99 and 100 are fixed to a frame 101. The frame 101 is supported by the base plate 8L at the left side thereof through a bracket 102 and a horizontal pin 103, and the frame 101 is in contact with a stopper 104 fixed on the base plate 8L at the right side end thereof to thereby keep a horizontal posture. Further, the frame 101 is connected to the base plate 8L through an air cylinder 105 at the central position thereof. Thus, when the air cylinder 105 is actuated to cause the cylinder rod 105a to project, the air cylinders 99 and 100 are inclined together with the frame 101.

Before the good seedlings 2a are introduced into the groove 7 of the delivery tray 3 from the transferring member 16, the air cylinders 99 and 100 are inclined as shown in FIG. 18 by actuation of the air cylinder 105. Then, upon actuation of the two air cylinders 99, 100 the expander 97 and the support 98 are advanced toward the delivery tray 3. Thereafter, the air cylinder 105 performs a retreated operation to thereby cause the frame 101 to return to the horizontal posture, and the expander 97 is entered into the groove 7 of the delivery tray 3 to thus expand the groove 7.

Thereafter, the shutter 95 is opened to form the exit of the transferring member 16, the pushing plate 75 and grippers 14 move in the transferring member 16 and push the good seedlings 2a out of the transferring member 16 to thereby supply them to the groove 7 of the delivery tray 3. Simultaneously, the air cylinder 100 is caused to retreat gradually, the support 98 is being retracted while holding the head of the good seedlings 2a. When the good seedlings 2a are supplied to the groove 7, the air cylinder 99 is caused to retreat, thereby pulling out the expander 97 from the groove 7. At that time, the good seedlings 2a remain in the groove 7 because the good seedlings 2a are supported by the support 98.

Thereafter, the table 87 is driven and the delivery tray 3 is fed by one pitch in one direction. By repeating the above operation, the good seedlings 2a are supplied into the groove 7.

Next, the whole operation in the apparatus for the selecting seedlings and transferring the same will be described in detail.

First, when the seedling 2 is reared so as to have a desirable size in the rearing chamber 4, the culture tray 1 is placed on the base plate 8R. The engaging member 20 of the culture tray feeding device 10 moves leftward in FIG. 10 and the culture tray 1 is fed by one pitch.

When the culture tray 1 is stopped, the front row of the seedlings 2 of the culture tray 1 are examined over three positions by the sensors 11, thereby judging the growth degree of the seedlings 2. After judging the quality of the seedlings 2 by the sensors 11, the engaging member 20 is actuated and the culture tray 1 is further fed by one pitch in a forward direction.

When the row of the seedlings 2 moves away from the row of the sensors 11, the pushers 12 push only the good seedlings 2a to thereby lift the good seedlings 2a at the upper portion of the rearing chambers 4. The cam 34 actuates the clutch device 31 by the lift of the pusher 12, the pushing device 13 is interconnected with the lifting mechanism of the grippers 14.

The grippers 14 move horizontally toward the good seedlings 2a by a retreated actuation of the air cylinder 43, thereby gripping the solid medium 6 of the good seedlings 2a. Thereafter, the air cylinders 51 and 52 are actuated, the row of the grippers 14 gripping the good seedlings 2a are moved upwardly together with the block 41. At the same time, the pushers 12 are moved upwardly to push the good seedlings 2a out of the rearing chambers 4. The pushers 12 corresponding to the seedlings 2 having a bad quality are not actuated, thus the bad seedlings 2 remain in the rearing chambers 4.

Thereafter, the grippers 14 go across over the receiving member 35 by the actuation of the air cylinders 43 and 44, and upon the actuation of the air cylinder 51 the grippers 14 are moved downwardly. Consequently, the good seedlings 2a are placed on the receiving member 35 while being gripped by the grippers 14.

Next, the nut 72 is moved by the rotation of the motor 74, the sliders 65 are moved along the guide rail 66 to convey the grippers 14 holding the good seedlings 2a toward the transferring member 16.

When the pushing plate 75 reaches the notch 86 of the transferring member 16, the row of the grippers 14 stops. Next, by the actuation of the cylinder 80, the transferring member 16 is moved horizontally to be away from the receiving member 35 and to cause the grippers 14 to disengage from the good seedlings 2a. At that time, the pushing plate 75 comes out of the transferring member 16 through the notch 86.

Thereafter, the row of the grippers 14 returns to the original position by the reverse rotation of the motor 74, and the transferring member 16 returns to the original position where the transferring member 16 is communicated with the receiving member 35.

By the same operation mentioned above, the grippers 14 convey the next row of the good seedlings 2a to the transferring member 16, the pushing plate 75 pushes out the good seedlings 2a which have already been supplied to the transferring member 16. The good seedlings 2a pushed out of the transferring member 16 are supplied to the groove 7 of the delivery tray 3 on the table 87. The number of the seedlings 2 supplied to the groove 7 is not uniform due to occurrence of the bad seedlings, however, the number of the seedlings 2 is detected by the sensors 11 and computed by a computer (not shown), pushing actuation is repeated until a predetermined number of the seedlings 2 are supplied to the groove 7 of the delivery tray 3.

When pushing the good seedlings 2a to the groove 7, by the retreated actuation of the air cylinder 105 and the extended actuation of the air cylinders 99 and 100, the expander 97 expands the groove 7 of the delivery tray 3, the support 98 becomes in a standby condition to push the good seedlings 2a by the forward end of the support 98. Thereafter, the shutter 95 is opened to form the exit of the transferring member 16, the pushing plate 75 and the grippers 14 move in the transferring member 16, the good seedlings 2a in the transferring member 16 are pushed out and supplied to the delivery tray 3. Further, by the actuation of the air cylinder 100 in synchronization with the above operation, the support 98 moves back while supporting the leading seedling 2a. After the good seedlings 2a are introduced in the groove 7, the expander 97 is pulled out of the groove 7 by the retreated actuation of the air cylinder 97. At this time, since the good seedlings 2a are supported by the support 98, the good seedlings 2a remain in the groove 7. Thereafter, by repeating the above operation, the good seedlings 2a are successively supplied into the grooves 7 of the delivery tray 3.

As is apparent from the forgoing description, according to the present invention, seedling can be automatically and rapidly transferred from the culture tray to the delivery tray without man power.

Further, according to the present invention, since only good seedling are taken out of the culture tray and bad seedlings remain in the culture tray, the seedlings can be automatically sorted in accordance with the quality of the seedlings.

Furthermore, according to the present invention, since the sensor means examine whether the seedlings are good or bad in quality, the quality of the seedlings can be accurately judged.

Although certain preferred embodiment of the present invention have been shown and described in detail, it should be understood that various changes and modifications may be made therein without departing from the scope of the appended claims.

What is claimed is:

1. An apparatus for selecting seedlings and transferring the same comprising:
   a first feeding device for intermittently feeding a culture tray having a plurality of rows of rearing chambers to rear seedlings, each of said rearing chambers having a solid medium therein and a hole at the bottom thereof;
   sensor means for examining the quality of said seedlings;
   a pushing device for pushing upwardly seedlings having a good quality along with the respective solid mediums, said pushing device having a plurality of pushers which are inserted into said respective holes of said rearing chambers;
   a taking-out device for simultaneously taking out and holding a plurality of said seedlings and respective solid mediums pushed upwardly from said rearing chambers;
   a transferring device for receiving said seedlings and respective solid mediums taken out of said rearing chambers and transferring them to a delivery tray which supports thereon a plurality of said good quality seedlings and respective solid mediums; and
   wherein said first feeding device moves a culture tray having a plurality of rows and columns of rearing chambers, and said seedlings are fed on said culture tray to the sensor means by said first feeding device in a direction generally perpendicular to said rows.

2. The apparatus for selecting seedlings and transferring the same according to claim 1, wherein said first feeding device feeds intermittently said culture tray by one pitch corresponding to an interval between two adjacent rows of said rearing chambers.

3. The apparatus for selecting seedlings and transferring the same according to claim 1, wherein said sensor means comprises a row of sensors which can examine whether a row of seedlings are good or bad in quality.

4. The apparatus for selecting seedlings and transferring the same according to claim 1, wherein said pusher takes two positions so that said seedling pushed by said pusher remains in said rearing chamber, and then said seedling is completely pushed out of said rearing chamber.

5. The apparatus for selecting seedlings and transferring the same according to claim 1, wherein said taking-out device comprises a row of grippers for gripping a row of seedlings and conveying them in a direction of said row of seedlings.

6. The apparatus for selecting seedlings and transferring the same according to claim 1, wherein said transferring device comprises a transferring member which receives a row of seedlings from said taking-out device and transfers the received row of seedlings to said delivery tray when a next row of seedlings are pushed into said transferring member.

7. The apparatus for selecting seedlings and transferring the same according to claim 6, wherein said transferring member includes a channel which supports said seedlings and respective solid mediums side by side.

8. The apparatus for selecting seedlings and transferring the same according to claim 7, further comprising a second feeding device for intermittently feeding said delivery tray having a plurality of grooves for receiving a row of seedlings, and wherein said channel is horizontally alignable with one of said grooves so that seedlings and respective solid mediums can be laterally inserted into said groove.

9. The apparatus for selecting seedlings and transferring the same according to claim 8, wherein said second feeding device feeds intermittently said delivery tray by one pitch corresponding to an interval between two adjacent grooves of said delivery tray.

10. The apparatus for selecting seedlings and transferring the same according to claim 9, further comprising guide means which is movably inserted into said groove of said delivery tray to facilitate introduction of said row of seedlings and respective solid mediums into said groove, wherein the guide means comprises an expander which is inserted into a groove of the delivery tray to expand the groove.

11. An apparatus for selecting seedlings and transferring the same comprising:
   a first feeding device for intermittently feeding a culture tray having a plurality of rows of rearing chambers to rear seedlings, each of said rearing chambers having a solid medium therein and a hole at the bottom thereof;
   sensor means for examining the quality of said seedlings;
   a pushing device for pushing upwardly seedlings having a good quality along with the respective solid mediums, said pushing device having a plurality of pushers which are inserted into said respective holes of said rearing chambers;
   a taking-out device for simultaneously taking out and holding a plurality of said seedlings and respective solid mediums pushed upwardly from said rearing chambers;
   a transferring device for receiving said seedlings and respective solid mediums taken out of said rearing chambers and transferring them to a delivery tray which supports thereon a plurality of said good quality seedlings and respective solid mediums; and
   wherein said sensor examines said seedlings at a plurality of height positions of said seedlings.

12. An apparatus for selecting seedlings and transferring the same comprising:
   a first feeding device for intermittently feeding a culture tray having a plurality of rows of rearing chambers to rear seedlings, each of said rearing chambers having a solid medium therein and a hole at the bottom thereof;
   sensor means for examining the quality of said seedlings;
   a pushing device for pushing upwardly seedlings having a good quality along with the respective solid mediums, said pushing device having a plurality of pushers which are inserted into said respective holes of said rearing chambers;
   a taking-out device for simultaneously taking out and holding a plurality of said seedlings and respective solid mediums pushed upwardly from said rearing chambers;
   a transferring device for receiving said seedlings and respective solid mediums taken out of said rearing chambers and transferring them to a delivery tray which supports thereon a plurality of said good quality seedlings and respective solid mediums; and
   further comprising a clutch device which interconnects said pushing device and said taking-out device so that said taking-out device operates together with said pushing device.

13. An apparatus for selecting seedlings and transferring the same comprising:

a first feeding device for intermittently feeding a culture tray having a plurality of rows of rearing chambers to rear seedlings, each of said rearing chambers having a solid medium therein and a hole at the bottom thereof;

sensor means for examining the quality of said seedlings;

a pushing device for pushing upwardly seedlings having a good quality along with the respective solid mediums, said pushing device having a plurality of pushers which are inserted into said respective holes of said rearing chambers;

a taking-out device for simultaneously taking out and holding a plurality of said seedlings and respective solid mediums pushed upwardly from said rearing chambers;

a transferring device for receiving said seedlings and respective solid mediums taken out of said rearing chambers and transferring them to a delivery tray which supports thereon a plurality of said good quality seedlings and respective solid mediums; and further comprising a second feeding device for intermittently feeding said delivery tray having a plurality of grooves for receiving a row of seedlings.

14. The apparatus for selecting seedlings and transferring the same according to claim 13, wherein said second feeding device feeds intermittently said delivery tray by one pitch corresponding to an interval between two adjacent grooves of said delivery tray.

15. The apparatus for selecting seedlings and transferring the same according to claim 13, further comprising guide means which is removably inserted into said groove of said delivery tray to facilitate introduction of said row of seedlings into said groove.

16. An apparatus for selecting seedlings and transferring the same comprising:

a first feeding device for intermittently feeding a culture tray having a plurality of rows of rearing chambers to rear seedlings, each of said rearing chambers having a solid medium therein and a hole at the bottom thereof;

sensor means for examining the quality of said seedlings;

a pushing device for pushing upwardly seedlings having a good quality along with the respective solid mediums, said pushing device having a plurality of pushers which are inserted into said respective holes of said rearing chambers;

a taking-out device for simultaneously taking out and holding a plurality of said seedlings and respective solid mediums pushed upwardly from said rearing chambers;

a transferring device for receiving said seedlings and respective solid mediums taken out of said rearing chambers and transferring them to a delivery tray which supports thereon a plurality of said good quality seedlings and respective solid mediums; and wherein said taking-out device comprises grippers for gripping solid mediums of the seedlings and wherein said grippers grip the solid medium after movement of said pusher to a first of said two positions and move upwardly with said pusher as said pusher moves toward a second of said two positions.

* * * * *